United States Patent
Kang et al.

(10) Patent No.: US 9,932,458 B2
(45) Date of Patent: Apr. 3, 2018

(54) RUBBER COMPOSITION FOR FLEXIBLE COUPLING

(71) Applicants: Hyundai Motor Company, Seoul (KR); Kia Motors Corporation, Seoul (KR); PCK Co., Ltd., Daegu (KR); TSR Co., Ltd., Gumi, Gyeongsangbuk-do (KR); Hyundai Mobis Co., Ltd., Seoul (KR)

(72) Inventors: Jae Wook Kang, Gyeonggi-do (KR); Kyung Mo Yang, Gyeonggi-do (KR); Byung Sub Park, Gyeonggi-do (KR); Kang Won Seo, Seoul (KR); Sung Chul Kim, Gyeongsangbuk-do (KR); Dong Won Lee, Daegu (KR)

(73) Assignees: Hyundai Motor Company, Seoul (KR); Kia Motors Company, Seoul (KR); PCK Co., Ltd., Daegu (KR); TSR Co., Ltd., Gumi, Gyeongsangbuk-Do (KR); Hyundai Mobis Co., Ltd., Seoul (KR)

( * ) Notice: Subject to any disclaimer, the term of this patent is extended or adjusted under 35 U.S.C. 154(b) by 104 days.

(21) Appl. No.: 14/985,517

(22) Filed: Dec. 31, 2015

(65) Prior Publication Data

US 2016/0376415 A1 Dec. 29, 2016

(30) Foreign Application Priority Data

Jun. 29, 2015 (KR) .................. 10-2015-0092081

(51) Int. Cl.
| | |
|---|---|
| C08K 7/00 | (2006.01) |
| C08K 3/04 | (2006.01) |
| C08K 3/22 | (2006.01) |
| C08K 5/11 | (2006.01) |
| C08L 15/00 | (2006.01) |

(52) U.S. Cl.
CPC .................. *C08K 3/04* (2013.01); *C08K 3/22* (2013.01); *C08K 5/11* (2013.01); *C08L 15/005* (2013.01); *C08K 2003/222* (2013.01); *C08K 2201/003* (2013.01); *C08K 2201/014* (2013.01)

(58) Field of Classification Search
CPC ............ C08K 3/04; C08K 3/11; C08L 15/005
See application file for complete search history.

(56) References Cited

U.S. PATENT DOCUMENTS

| | | | | |
|---|---|---|---|---|
| 6,410,653 | B1 * | 6/2002 | Fujii ....................... | C08C 19/28 525/285 |
| 7,847,008 | B2 * | 12/2010 | Moritani ............. | C08K 5/0025 524/261 |
| 2007/0167555 | A1 * | 7/2007 | Amino ...................... | B60C 1/00 524/495 |
| 2008/0097020 | A1 * | 4/2008 | Kunieda .................. | C08K 5/09 524/440 |
| 2009/0226722 | A1 * | 9/2009 | Uhida .................... | B82Y 30/00 428/402 |
| 2010/0029811 | A1 | 2/2010 | Shirose | |

FOREIGN PATENT DOCUMENTS

| | | |
|---|---|---|
| JP | 11-062027 A | 3/1999 |
| JP | 2010-031151 A | 2/2010 |
| JP | 2011-196526 A | 10/2011 |
| KR | 10-1998-0079921 | 11/1998 |
| KR | 2003-0024046 A | 3/2003 |
| KR | 10-2004-0090118 A | 10/2004 |
| KR | 2009-0132269 A | 12/2009 |

OTHER PUBLICATIONS

Extended European Search Report for European Patent Application No. 15202811.4, dated Oct. 28, 2016, 8 pages.

* cited by examiner

*Primary Examiner* — Hannah Pak
(74) *Attorney, Agent, or Firm* — Mintz Levin Cohn Ferris Glovsky and Popeo, P.C.; Peter F. Corless

(57) ABSTRACT

Disclosed is a rubber composition for flexible coupling. In particular, the rubber composition for flexible coupling is prepared by mixing a filler including an HNBR alloy and carbon blacks having different average particle diameters with a hydrogenated acrylonitrile-butadiene rubber such that performance deterioration due to hydrolysis can be prevented even in hot and humid environments and the rubber composition has superior heat resistance and improved mechanical strength.

15 Claims, No Drawings

RUBBER COMPOSITION FOR FLEXIBLE COUPLING

CROSS-REFERENCE TO RELATED APPLICATION

This application claims under 35 U.S.C. § 119(a) the benefit of priority to Korean Patent Application No. 10-2015-0092081 filed on Jun. 29, 2015, the entire contents of which are incorporated herein by reference.

TECHNICAL FIELD

The present invention relates to a rubber composition for flexible coupling. In particular, the rubber composition for flexible coupling may be prepared by mixing a filler including an HNBR alloy and carbon blacks having different average particle diameters with a hydrogenated acrylonitrile-butadiene rubber such that performance deterioration due to hydrolysis may be prevented even in hot and humid environments, and the rubber composition may have superior heat resistance and enhanced mechanical strength.

BACKGROUND

Hydraulic pressure of oil and power of electric motors are used in vehicle power steering. In particular, in use of hydraulic pressure, a hydraulic pressure pump pumps a fluid through power of an engine to form hydraulic pressure, and then, direction is switched and handling of the vehicle may become smooth by sending hydraulic pressure in a steered direction when a driver turns a steering wheel. In addition, motor driven power steering (MDPS) system uses a steering powder through motor power instead of hydraulic pressure. In the MDPS, an electric motor automatically performs control functions according to driving conditions, thereby having enhanced steering performance and steering feel, when compared with the hydraulic pressure-type power steering.

Such MDPS typically includes a motor for assisting a steering wheel, and properly assists operation force by electronically controlling output of a motor according to speed and steering torque. In addition, the MDPS includes a worm wheel coupled to a steering shaft extending therethrough and a worm shaft engaged with the worm wheel. In addition, the MDPS includes a tilt bearing such that engagement of the worm wheel and the worm shaft can be optimized. In addition, in the MDPS, a motor and a worm shaft are connected by a coupling as a separate connection member, thereby transferring motor power to a worm shaft.

However, the MDPS may have problems such as crackling dull noise upon release after steering of a steering wheel on waiting. In addition, when vehicles drive on a hard road or a bumpy road, great reaction force from the road is transferred to the steering shaft and, at this time, rattling noise may occur due to a gap between the worm wheel and the worm shaft. Such noise may frequently occur as an inner race constituting the tilt bearing moves in the axial direction of the worm shaft.

Accordingly, the coupling absorbs impact sound when the worm shaft moves in the axial direction. Conventionally, the couplings have been manufactured using urethane rubber. Although urethane rubber is resistant to repeated wear of a counterpart, when installed in a steering system, due to superior wear resistance thereof and has superior mechanical strength by power transfer and superior oil resistance and ozone resistance, the urethane rubber may be hydrolyzed in hot and humid environment, thereby decreasing functions of products.

In the related arts, Korean Patent Application Pub. No. 2003-0024046 discloses a certain power steering hose for high pressure including a certain inner-side rubber layer composed of a material that includes 50 to 80 parts by weight of carbon black, 10 to 30 parts by weight of zinc oxide, 10 to 30 parts by weight of an antioxidant, 1 to 10 parts by weight of a vulcanization accelerator and 0.1 to 2 parts by weight of a vulcanizing agent based on 100 parts by weight of hydrogenated nitrile-butadiene rubber. However, the product functions may be deteriorated due to hydrolysis.

In addition, Korean Patent Application Pub. No. 1998-079921 discloses a certain elastomer composition including hydrogenated acrylonitrile butadiene rubber, non-modified hydrogenated acrylonitrile butadiene rubber, a peroxide curing aid, an organic peroxide and carbon black. However, the elastomer composition may have a disadvantage such as poor mechanical strength against wear or impact.

Therefore, there is a need for a novel material which can prevent function decrease due to hydrolysis and breakage upon friction against coupling as a connection member or impact occurrence, even in hot and humid environments.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to solve the above-described problems associated with the related art.

In preferred aspects, the present invention provides a rubber composition such that performance thereof may not deteriorate by hydrolysis even in hot and humid environments and heat resistance and enhanced mechanical strength thereof may be substantially improved. In particular, the rubber composition may be prepared by mixing a filler including a hydrogenated nitrile butadiene rubber (HNBR) alloy and carbon blacks having different average particle diameters with a hydrogenated acrylonitrile-butadiene rubber.

The "HNBR alloy", as used herein, refers to a mixture or complex that is produced by mixing a metal component into at least HNBR components. For example, the metal component included in the HNBR alloy may be magnesium or magnesium compound such as magnesium oxide.

Accordingly, in one aspect, provided is a rubber composition for flexible coupling that may prevent performance deterioration due to hydrolysis.

In an exemplary embodiment, the rubber composition for flexible coupling may comprise: a rubber component comprising an amount of about 60 to 80% by weight of a hydrogenated acrylonitrile-butadiene rubber and an amount of about 20 to 40% by weight of an HNBR alloy, based on the total weight of the rubber component; an amount of about 60 to 180 parts by weight of a filler based on the 100 parts by weight of the rubber component; an amount of about 0.1 to 5 parts by weight of a hardener based on the 100 parts by weight of the rubber component; an amount of about 0.1 to 5 parts by weight of an accelerator based on the 100 parts by weight of the rubber component; an amount of about 1 to 30 parts by weight of a crosslinker based on the 100 parts by weight of the rubber component; an amount of about 0.1 to 10 parts by weight of a processing aid based on the 100 parts by weight of the rubber component; and 1 to 30 parts by weight of a plasticizer based on 100 parts by weight of the rubber component.

In another aspect, provided is a flexible coupling for vehicle MDPS steering systems, which may have superior heat resistance and enhanced mechanical strength. The flexible coupling for a vehicle MDPS steering system may comprise the rubber composition as described above.

Further provided is a method of manufacturing the flexible coupling for a vehicle MDPS steering system. The method may comprise molding the flexible coupling using the rubber composition as described herein, suitably by a mold.

Other aspects and preferred embodiments of the invention are discussed infra.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a rubber composition for flexible coupling. The rubber composition may include: a rubber component comprising an amount of about 60 to 80% by weight of a hydrogenated acrylonitrile-butadiene rubber and an amount of about 20 to 40% by weight of an HNBR alloy, based on the total weight of the rubber component; an amount of about 60 to 180 parts by weight of a filler based on the 100 parts by weight of the rubber component; an amount of about 0.1 to 5 parts by weight of a hardener based on the 100 parts by weight of the rubber component; an amount of about 0.1 to 5 parts by weight of an accelerator based on the 100 parts by weight of the rubber component; an amount of about 1 to 30 parts by weight of a crosslinker based on the 100 parts by weight of the rubber component; an amount of about 0.1 to 10 parts by weight of a processing aid based on the 100 parts by weight of the rubber component; and an amount of about 1 to 30 parts by weight of a plasticizer based on 100 parts by weight of the rubber component.

The hydrogenated acrylonitrile-butadiene rubber, as used herein, may have improved heat resistance through hydrogenating double bonds in acrylonitrile-butadiene rubber molecules and have properties such as superior wear resistance, heat resistance and oil resistance, and superior chemical resistance against bases and ozone. As the hydrogenated acrylonitrile-butadiene rubber, a hydrogenated acrylonitrile-butadiene rubber having a hardness of about 70 IRHD or greater, particularly from about 80 to about 90 IRHD, may be used. The "IRHD" as used herein refers to a certain measuring standard for rubber properties according to International Rubber Hardness Degrees.

In addition, the hydrogenated acrylonitrile-butadiene rubber may have a tensile strength of about 250 to 350 kg$_f$/cm$^2$ and an elongation of about 250 to 350%.

The content of the hydrogenated acrylonitrile-butadiene rubber in the rubber component may be of about 60 to 80% by weight, based on the total weight of the rubber component. When the content of the hydrogenated acrylonitrile-butadiene rubber is less than about 60% by weight, wear resistance, heat resistance and oil resistance may be decreased. When the content of the hydrogenated acrylonitrile-butadiene rubber is greater than about 80% by weight, mechanical strength and hydrolysis resistance may be decreased.

The HNBR alloy may provide superior wear resistance and mechanical strength, particularly advantages such as strong resistance against hot water, humidity, steam, and the like due to superior hydrolysis resistance. The content of the HNBR alloy may be of about 20 to 40% by weight, based on the total weight of the rubber component. When content of the HNBR alloy is less than about 20% by weight, wear resistance, mechanical strength and hydrolysis resistance may be decreased. When content of the HNBR alloy is greater than about 40% by weight, viscosity may increase substantially and thus processing of products may be difficult. Accordingly, the content of the HNBR alloy may be preferably of about 20 to 30% by weight.

The filler may be a mixture of a first carbon black and a second carbon black, and average particle diameters of the first carbon black and the second carbon black may be different. In particular, an average particle diameter of the first carbon black may be of about 30 to 55 nm, or particularly of about 40 to 55 nm. For example, a fast extruding furnace (FEF) carbon black having an average particle diameter of about 40 to 52 nm may be suitably used. Since the first carbon black has a less particle diameter than that of the second carbon black, heat resistance of a rubber composition may be enhanced. The second carbon black may have an average particle diameter of about 55 to 100 nm, or particularly 55 to 95 nm. For example, semi-reinforcing furnace (SRF) carbon black having an average particle diameter of about 58 to 94 nm may be suitably used. Since the second carbon black has a relatively large particle diameter, compared to the first carbon black, mechanical strength of a rubber composition may be improved.

It is appreciated that Asahi Carbon FEF (Asahi #60, JAPAN) and the like may provide suitable options for the first carbon black among general carbon blacks, and SRF (Asahi #35, JAPAN) and the like may provide suitable options for the second carbon black, however exemplary first and second carbon blacks may not be limited thereto. For example, Asahi Carbon FEF (Asahi #60, JAPAN) and SRF (Asahi #35, JAPAN) have characteristics summarized in the following Table 1, and thus, tensile strength, wear resistance and water resistance of a rubber composition are enhanced.

TABLE 1

| Classification | Average particle diameter | Specific surface area | Urea adsorption amount | Non-coloring degree | Oil absorption amount | Weight loss on heating | Ash content | Volatile matter |
|---|---|---|---|---|---|---|---|---|
| FEF (Asahi #60) | 45 | 40 | 43 | 65 | 114 | 0.3 | 0.2 | 1.0 |
| SRF (Asahi #55) | 78 | 24 | 23 | 48 | 50 | 0.3 | 0.2 | 1.0 |

Further, the mixture may be a mixture of the first carbon black and the second carbon black mixed in a weight ratio of about 80:20 to 95:5. In particular, when a weight ratio of the first carbon black to the second carbon black in the mixture is less than about 80:20, tensile strength may increase, but an elongation rate may be decreased. When a weight ratio of the first carbon black to the second carbon black in the mixture is greater than about 95:5, an elongation rate may increase, but tensile strength may be decreased. The first carbon black and the second carbon black may be suitably mixed in a weight ratio of about 82:18 to 90:10.

The filler may be a filler having nitrogen absorption surface area per gram (N2SA) of about 30 to 300 m/g and a DBP (n-dibutyl phthalate) oil absorption amount of about 60 to 180 cc/100 g, but exemplary filler of the present invention may not be limited thereto. In particular, when the nitrogen absorption surface area is less than about 30 m/g, reinforcement might not be exhibited. When the nitrogen absorption surface area per gram is greater than about 300 m/g, processability of the rubber composition may be poor. In addition, when the DBP oil absorption amount is less than about 60 cc/100 g, proper reinforcement by a filler might not be exhibited. When the DBP oil absorption amount is greater than about 180 cc/100 g, processability of the rubber composition may be decreased.

Further, the filler may be included in an amount of about 60 to 180 parts by weight based on 100 parts by weight of the rubber. When the content of the filler is less than about 60 parts by weight, hardness and tensile strength may be decreased. When the content of the filler is greater than about 180 parts by weight, hardness and tensile strength may increase, but elongation rate may be decreased. The content of the filler may be suitably of about 100 to 150 parts by weight, or particularly about 125 to 140 parts by weight.

The hardener may be sulfur (S), particularly one or more selected from the group consisting of sulfur powder, insoluble sulfur, sedimentary sulfur and colloidal sulfur. Due to the hardener, the hydrogenated acrylonitrile-butadiene rubber as a raw rubber component may become less sensitive to heat and chemically stable. The hardener may be included in an amount of about 0.1 to 5 parts by weight, of about 0.2 to 2 parts by weight, or particularly 0.6 to 1 parts by weight, based on 100 parts by weight of the rubber.

The accelerator, as used herein, may accelerate vulcanization speed or delay function in an initial vulcanization step. For example, the accelerator may be one or more selected from the group consisting of tetramethylthiuram monosulfide, tetramethylthiuram disulfide, tetraethylthiuram disulfide, tetrabutylthiuram disulfide, dipentamethylenethiuram tetrasulfide, N-cyclohexyl-2-benzothiazolylsulfenamide, N-oxydiethylene-2-benzothiazolylsulfenamide, N-tert-butyl-2-benzothiazolylsulfenamide and N,N'-dicyclohexyl-2-benzothiazolylsulfenamide.

Further, the accelerator may be included in an amount of about 0.1 to 5 parts by weight, of about 0.2 to 2 parts by weight, or particularly of about 0.6 to 1 parts by weight, based on 100 parts by weight of the rubber.

The crosslinker, as used herein, may promote crosslinking of the components of the rubber composition, such that molecules of the hydrogenated acrylonitrile-butadiene rubber may chemically bind to form a net structure, whereby the hydrogenated acrylonitrile-butadiene rubber as a raw rubber component may become less sensitive to heat and chemically stable.

The crosslinker may be one or more organic peroxides selected from the group consisting of benzoyl peroxide, dicumyl peroxide, di-t-butyl peroxide, t-butyl cumyl peroxide, methylethylketone peroxide, cumene hydroperoxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexane, 1,3-bis(t-butylperoxypropyl)benzene, di-t-butylperoxy-diisopropylbenzene, t-butylperoxybenzene, 2,4-dichlorobenzoyl peroxide, 1,1-dibutylperoxy-3,3,5-trimethylsiloxane and n-butyl-4,4-di-t-butylperoxyvalerate.

In addition, the crosslinker may include in an amount of about 1 to 30 parts by weight, of about 5 to 25 parts by weight, or particularly of about 14 to 20 parts by weight, based on 100 parts by weight of the rubber.

The processing aid, as used herein, may accelerate vulcanization speed. For example, the processing aid may be one or more metal oxide selected from the group consisting of zinc oxides, magnesium oxides and lead oxides, one or more fatty acids selected from the group consisting of stearic acids, oleic acids and palmitic acids, or one or more selected from the group consisting of triallyl isocyanurate, ethylene glycol dimethacrylate and trimethylolpropane methacrylate. Preferably, the processing aid may be one or more selected from the group consisting of zinc oxides, stearic acid and triallyl isocyanurate.

The plasticizer, as used herein may be a derivative of phthalic acid, isophthalic acid, adipic acid, sebacic acid, benzoic acid and phosphoric acid, and one or more selected from the group consisting of dioctyl phthalate (DOP), dibutyl phthalate (DBP), di-(2-ethylhexyl)phthalate, di-iso-octylphthalate (DIOP), higher alcohol phthalate, di-(2-ethylhexyl) sebacate, polyester adipate, dibutyl diglycol adipate, di(butoxyethoxyethyl) adipate, isooctyl-tol oil fat ester, tributyl phosphate (TBP), tributoxyethyl phosphate (TBEP), tricresyl phosphate (TCP), cresyl diphenyl phosphate (CDP) and diphenyl alkane.

Further, the plasticizer may be included in an amount of about 1 to 30 parts by weight, of about 5 to 25 parts by weight, or particularly of about 13 to 20 parts by weight, based on 100 parts by weight of the rubber.

The rubber composition may further include an amount of about 0.1 to 15 parts by weight of an antioxidant and an amount of about 0.1 to 10 parts by weight of a lubricant based on 100 parts by weight of the rubber composition for flexible coupling.

The antioxidant may be one or more selected from the group consisting of phenyl-α-naphthylamine, 2,2,4-trimethyl-1,2-dihydroquinoline polymer (TMDQ), 6-ethoxy-2,2,4-trimethyl-1,2-dihydroquinoline (ETMDQ), p,p'-dioctyldiphenylamine (ODPA), p,p'-dicumyldiphenylamine (DCDP), N,N'-di-2-naphthyl-p-phenylenediamine (DNPD), N,N'-diphenyl-p-phenylenediamine (DPPD), N-phenyl-N'-isopropyl-p-phenylenediamine (IPPD) and N-phenyl-N'-1,3-dimethylbutyl-p-phenylenediamine (6PPD).

In addition, the antioxidant may be included in an amount of about 0.1 to 15 parts by weight, of about 0.2 to 10 parts by weight, or particularly of about 0.5 to 5 parts by weight, based on 100 parts by weight of the rubber.

The lubricant may improve dispersibility, decrease viscosity and adhesion of a vulcanized rubber, and enhance dimensional stability. For example, the lubricant may be one or more petroleum-based oils selected from the group consisting of paraffin-based oils, naphthene-based oils, aromatic oils, or one or more plant oils selected from the group consisting of castor oil, cotton seed oil, linseed oil, canola oil, soybean oil, palm oil, coconut oil, peanut oil, pine oil, pine-tar, tall oil, corn oil, rice bran oil, safflower oil, sesame oil, olive oil, sunflower oil, palm kernel oil, *camellia* oil, jojoba oil, macadamia nut oil, safflower oil and tung oil.

According to a preferred embodiment of the present disclosure, the lubricant may be used in an amount of about 0.1 to 10 parts by weight, of about 0.2 to 6 parts by weight, or particularly of about 0.5 to 4 parts by weight, based on 100 parts by weight of the rubber.

The present invention also provides a flexible coupling for a vehicle MDPS steering system. The flexible coupling for a vehicle MDPS steering system may comprise the rubber composition as described above.

Further, the flexible coupling for vehicle MDPS steering systems may be manufactured by molding using a mold.

Accordingly, the rubber composition for flexible coupling according to the present invention may be prepared by mixing the hydrogenated acrylonitrile-butadiene rubber and the HNBR alloy and thus, the rubber composition may not be hydrolyzed. As consequence, performance deterioration due to hydrolysis may be prevented even in hot and humid environments. In addition, superior heat resistance and enhanced mechanical strength are exhibited by mixing the filler including the carbon blacks having different average particle diameters, and the rubber composition may be utilized as a material of a flexible coupling for a vehicle MDPS steering system.

EXAMPLES

The following examples illustrate the invention and are not intended to limit the same.

Examples 1 to 3 and Comparative Examples 1 to 4

Each component was added to a roll mill in a mixing ratio as summarized in Table 2 below and mixed. As the roll mill, a 3 l Kansai wonder kneader and an 8" roll available from BONG SHIN Co., Ltd. (South Korea) were used.

TABLE 2

| | Ingredients | Comparative Example 1 | Comparative Example 2 | Comparative Example 3 | Comparative Example 4 | Example 1 | Example 2 | Example 3 |
|---|---|---|---|---|---|---|---|---|
| | Hydrogenated acrylonitrile-butadiene rubber (Therban LT2157) | 100 | 100 | 100 | 90 | 80 | 75 | 70 |
| | HNBR alloy | 0 | 0 | 0 | 10 | 20 | 25 | 30 |
| Fillers | FEF carbon black (manufactured by Asahi Carbon Co., Ltd., particle diameter: 40 to 52 nm) | 110 | 0 | 95 | 95 | 98 | 100 | 105 |
| | SRF carbon black (manufactured by Asahi Carbon Co., Ltd., particle diameter: 55 to 95 nm) | 0 | 137 | 27 | 27 | 22 | 22 | 22 |
| Hardener | Sulfur (sulfur powder 99.9%, MIDAS SP 325, manufactured by Miwon Commercial Co., Ltd.) | 0.5 | 0.5 | 0.5 | 0.5 | 0.5 | 0.5 | 0.6 |
| Accelerators | Tetramethylthiuram disulfide (manufactured by OUCHI SHINKO CHEMICAL INDUSTRIAL CO., LTD.) | 0.3 | 0.3 | 0.3 | 0.3 | 0.3 | 0.3 | 0.3 |

TABLE 2-continued

| Ingredients | | Comparative Example 1 | Comparative Example 2 | Comparative Example 3 | Comparative Example 4 | Example 1 | Example 2 | Example 3 |
|---|---|---|---|---|---|---|---|---|
| | N-cyclohexyl-2-benzo thiazolylsulfenamide (manufactured by OUCHI SHINKO CHEMICAL INDUSTRIAL CO., LTD.) | 0.3 | 0.3 | 0.3 | 0.3 | 0.3 | 0.3 | 0.3 |
| Crosslinker | Perhexa 25b-40 (manufactured by NOF CORPORATION) | 9 | 9 | 11 | 13 | 13 | 13 | 13 |
| Processing aid | Triallyl isocyanurate | 1.8 | 1.8 | 2.8 | 3.1 | 3.1 | 3.1 | 3.0 |
| Plasticizer | Di-(2-ethylhexyl)sebacate (manufactured by New Japan Chemical Co., Ltd.) | 9 | 9 | 9 | 9 | 9 | 9 | 12 |
| Antioxidants | Antage 3C (manufactured by Kawaguchi Chemical Industry Co., LTD.) | 1 | 1 | 1 | 1 | 1 | 1 | 1 |
| | Antage 6c (manufactured from Kawaguchi Chemical Industry Co., LTD.) | 1 | 1 | 1 | 1 | 1 | 1 | 1 |
| Lubricant | WB 222 (manufactured from struktol) | 2 | 2 | 2 | 2 | 2 | 2 | 2 |

Test Example: Property Evaluation of Rubber Compositions

Using rubber compositions prepared according to Examples 1 to 3 and Comparative Examples 1 to 4, test pieces were manufactured as defined in KS M 6518 5.2 test piece and then properties thereof were quantitatively evaluated. Evaluation methods are as follows. Results are summarized in Table 3 below.

[Evaluation Method]
(1) Test Piece Tests
1) Hardness (KS M6518)

Measurement range: A Shore A hardness tester was used to measure hardness of a relatively soft elastomer. Testings was carried out by impregnating a test piece under a hardness tester under specific strength for specific time.

Measurement procedure: A test piece and a hardness tester were laid side by side on a hard and flat surface. The test piece and the hardness tester were brought into contact with the surface and then a hardness value was measured within a specific time.

Test piece size: Pieces were stacked to a thickness of 6 mm or more.

Result value: Data was classified as "A" and "D" according to hardnesses of test pieces. "A" was applied to a relatively soft material, compared to "D", and test pieces developed through the research used Shore A as a unit.

2) Tensile Strength—Elongation (KS M6518)

Measurement range: Power applied and length stretched were measured until test pieces were destroyed.

Measurement procedure: Test pieces were hung on an Instron grip and were pulled until destroyed. Measurement speed was determined depending on characteristics of test pieces. An extensometer was attached to measure elongation and modulus.

Test piece size: A test piece having a dumbbell shape was used.

Result value: Maximum tensile strength (kgf/cm$^2$) and elongation (%) until fracture occurred.

3) Hydrolysis Resistance (KS M6518)

Measurement procedure: The size of an original test piece was measured and then the test piece was placed within 75% height of the height of the original test piece between compression equipment. The placed test piece was stood at a specific temperature for 70 hours and then cooled for 30 minutes, followed by size measurement.

Test piece size: thickness was 12.5 mm+/−0.5 mm and diameter is 29.0 mm+/−0.5 mm Result value: (%) CB=[(to−ti)/(to−tn)]×100, where CB=compression set, to =original thickness of test piece, ti=final thickness of test piece, tn=thicknesses of used spacers.

4) Aging Test (KS M6518)

Measurement range: Aging test was a test to measure aging of rubber due to heat. After heating, hardness, tensile strength, elongation, etc. were measured, which was performed to confirm numerical changes before and after heating.

Measurement procedure: Test pieces were hung up in a constant-temperature bath and heated to age the same. Here, the hung test pieces were not contact each other or be attached to a wall of the bath. Test pieces were aged at a regulated temperature for a regulated time. Subsequently, the test pieces were removed from the constant-temperature bath and were sufficiently cooled at room temperature. Subsequently, hardness, tensile strength and elongation were measured, and change ratios before and after aging were confirmed.

Test piece size: A test piece having a dumbbell-shape was used.

Result values: hardness change (point), tensile strength change ratio (%), elongation change ratio (%)

5) Oil Resistance Test (ASTM D 471)

Measurement range: An oil resistance test was a test to measure changes in the size, mass, volume and mechanical properties of a rubber before and after dipping in oil. In particular, as oil resistance tests, there were ISO 1817, ASTM D 471, D 1460, BS 903: Part 16, DIN 53521, etc. as standard test methods, which measure resistance of a rubber against action of a fluid. During a test procedure, a specimen was exposed to a fluid at a regulated temperature for a regulated time. ASTM NO#1 and ASTM NO#3 as standard fluids close to a used oil were classified as an aniline point (POINT). ASTM NO#1 represents a standard fluid of a high aniline point, ASTM NO#2 represents a standard fluid of a medium aniline point, and ASTM NO#3 represents a standard fluid of a low aniline point.

Measurement procedure: Each test piece was placed in a separate container containing a liquid and tested in a place without direct light. Test piece was soaked at a regulated temperature for a regulated time. Subsequently, the test piece was soaked in a container containing fresh liquid of the same type and cooled for 30 to 60 minutes. After wiping a liquid remaining on the test piece, hardness, tensile strength, elongation, volume and the like thereof were measured.

Test piece size: A test piece having a dumbbell-shape was used.

Result values: Hardness change (point), tensile strength change ratio (%), elongation change ratio (%), volume change ratio (%)

(2) Product Test

1) IRHD Hardness (KS M6511)

Measurement range: International rubber hardness (IRHD) of small and thin rubber test pieces was measured.

Measurement procedure: International rubber hardness (IRHD) of test pieces was measured using an IRHD hardness tester.

Test piece size: 0.5 mm or greater were are used.

Result value: IRHD hardness

2) Compression Set (KS M6518)

Measurement range: A compression set is a method of measuring elasticity-maintaining force of an elastomer after continuously providing a constant compression force for specific time. The standard of this test is useful for compression set measurement of an elastomer.

Measurement procedure: The size of a product (O-ring) was measured and then the product was placed within 75% of the size of the product between a compression equipment. In addition, the product was stood at a specific temperature for 70 hours and then cooled for 30 minutes, followed by size measurement.

Test piece size: 3 mm+/−0.1 mm thickness

Result value: (%) CB=[(to−ti)/(to−tn)]×100, where CB=compression set, to =original thickness of test piece, ti=final thickness of test piece, and to =spacer thicknesses.

TABLE 3

| Test items | | Standard | Comparative Example 1 | Comparative Example 2 | Comparative Example 3 | Comparative Example 4 | Example 1 | Example 2 | Example 3 |
|---|---|---|---|---|---|---|---|---|---|
| Basic properties | Hardness Hs (Shore A) | 85 ± 5 | 85 | 83 | 83 | 84 | 80 | 83 | 82 |
| | Tensile strength Tb (kgf/cm2) | 250 or more | 230 | 270 | 245 | 255 | 260 | 340 | 330 |
| | Elongation percentage Eb (%) | 250 or more | 320 | 240 | 305 | 270 | 290 | 310 | 310 |
| Per temperature condition | | 135° C. × 70 HRS | 135° C. × 70 HRS | 135° C. × 70 HRS | 135° C. × 70 HRS | 135° C. × 70 HRS | 135° C. × 70 HRS | 135° C. × 70 HRS | 135° C. × 70 HRS |
| Aging test | Hardness change ΔH (Points) | +5 or less | +4 | +6 | +4 | +2 | +2 | +2 | +2 |
| | Tensile strength change ratio Ac (Tb) (%) | −10 or less | −14 | −21 | −8 | −9 | −3 | −1 | −2 |
| | elongation change ratio Ac (Eb) (%) | −20 or less | −40 | −25 | −18 | −13 | +10 | +3 | +5 |
| C/S (135° C. × 22 HRS) | | 25 or less | 38 | 52 | 47 | 29 | 18 | 13 | 15 |
| Oil resistance test (ASTM NO#1) | Hardness change CH (Points) | −5 to +10 | +7 | +10 | +8 | +6 | +3 | +1 | +2 |
| | Tensile strength change ratio Sc (Tb) (%) | −20 or less | −25 | −36 | +3 | −5 | −2 | −2 | −1 |
| | Elongation change ratio Sc (Eb) (%) | −40 or less | −63 | −41 | −28 | −27 | +10 | +10 | +9 |
| | ΔV (%) | −10 to +5 | −8 | −9 | −3 | −7 | −3 | −3 | −3 |
| Oil resistance test (ASTM NO#3) | Hardness change CH (Points) | −10 to +5 | −15 | −12 | −13 | −11 | −13 | −8 | −8 |
| | Tensile strength change ratio Sc (Tb) (%) | −35 or less | −50 | −42 | −17 | −13 | −8 | −4 | −5 |
| | Elongation change ratio Sc (Eb) (%) | −35 or less | −56 | −49 | −24 | −28 | +10 | +10 | +8 |

TABLE 3-continued

| Test items | | Standard | Comparative Example 1 | Comparative Example 2 | Comparative Example 3 | Comparative Example 4 | Example 1 | Example 2 | Example 3 |
|---|---|---|---|---|---|---|---|---|---|
| Hydrolysis resistance (MS 256-26) 125° C. × 48 HRS | Hardness change CH (Points) | ±5 | −7 | −8 | −5 | −1 | 0 | 0 | 0 |
| | Tensile strength change ratio Sc (Tb) (%) | — | −16 | −29 | −21 | −2 | +5 | +5 | +4 |
| | Elongation change ratio Sc (Eb) (%) | — | −45 | −31 | −35 | −11 | −8 | −7 | −4 |
| | ΔV (%) | — | +8 | +19 | +10.1 | +1.0 | +0.7 | +0.5 | +0.3 |

As shown in results of the Table 3, it can be confirmed that, in the aging test, the oil resistance test (ASTM NO#1), the oil resistance test (ASTM NO#3) and the hydrolysis resistance test of Comparative Examples 1 to 3 including only the hydrogenated acrylonitrile-butadiene rubber, the tensile strength change ratios, elongation change ratios and compression sets (C/S) did not meet required standard performances. In addition, it can be confirmed that, in the case of Comparative Example 4, properties required in the aging test, the oil resistance test (ASTM NO#1) and the hydrolysis resistance test were satisfied, but properties in the oil resistance test (ASTM NO#1), the compression set (C/S), etc. were not satisfied.

On the contrary, it can be confirmed that, in the cases of Examples 1 to 3, all values measured in the aging tests, the oil resistance tests (ASTM NO#1), the oil resistance tests (ASTM NO#3) and the hydrolysis resistance tests satisfied required standard performances. In addition, it can be confirmed that ranges of the measured values were greatly enhanced, compared to Comparative Example 4, and, particularly, change widths in hardness and elongation rate change ratio were greatly decreased in the hydrolysis resistance test.

Accordingly, since the hydrogenated acrylonitrile-butadiene rubber was mixed with the HNBR alloy in the rubber compositions for flexible coupling manufactured according to Examples 1 to 3, hydrolysis did not occur, thereby preventing performance deterioration due to hydrolysis even in hot and humid environment. In addition, it can be confirmed that heat resistance and enhanced mechanical strength may be exhibited by mixing the filler including the carbon blacks having different average particle diameters.

The rubber composition for flexible coupling according to the present invention prepared by mixing a hydrogenated acrylonitrile-butadiene rubber and an HNBR alloy may not be hydrolyzed, and thus, performance deterioration due to hydrolysis may be prevented even in hot and humid environment.

In addition, superior heat resistance and enhanced mechanical strength may be obtained by mixing a filler including carbon blacks having different average particle diameters, and the rubber composition including the filler may be utilized as a material of a flexible coupling for a vehicle MDPS steering system.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A rubber composition for flexible coupling comprising:
   a rubber component comprising an amount of about 60 to 80% by weight of a hydrogenated acrylonitrile-butadiene rubber and 20 to 40% by weight of an hydrogenated nitrile butadiene rubber (HNBR) alloy, % by weight based on the total weight of the rubber component;
   an amount of about 60 to 180 parts by weight of a filler based on 100 parts by weight of the rubber component;
   an amount of about 0.1 to 5 parts by weight of a hardener based on 100 parts by weight of the rubber component;
   an amount of about 0.1 to 5 parts by weight of an accelerator based on 100 parts by weight of the rubber component;
   an amount of about 1 to 30 parts by weight of a crosslinker based on 100 parts by weight of the rubber component;
   an amount of about 0.1 to 10 parts by weight of a processing aid based on 100 parts by weight of the rubber component; and
   an amount of about 1 to 30 parts by weight of a plasticizer based on 100 parts by weight of the rubber component,
   wherein the hydrogenated acrylonitrile-butadiene rubber has a tensile strength of about 250 to 350 kg/cm$^2$ and an elongation of about 250 to 350%.

2. The rubber composition according to claim 1, wherein the filler is a mixture of a first carbon black and a second carbon black.

3. The rubber composition according to claim 2, wherein an average particle diameter of the first carbon black is from about 30 to about 55 nm and an average particle diameter of the second carbon black is from about 55 to about 100 nm.

4. The rubber composition according to claim 2, wherein, in the mixture, the first carbon black and the second carbon black are mixed in a weight ratio of about 80:20 to 95:5.

5. The rubber composition according to claim 1, wherein the filler has a nitrogen absorption surface area of about 30 to 300 m/g and a DBP oil absorption amount of about 60 to 180 cc/100 g.

6. The rubber composition according to claim 1, wherein the hardener is one or more selected from the group consisting of sulfur powder, insoluble sulfur, sedimented sulfur and colloid sulfur.

7. The rubber composition according to claim 1, wherein the accelerator is one or more selected from the group consisting of tetramethylthiuram monosulfide, tetramethylthiuram disulfide, tetraethylthiuram disulfide, tetrabutylthiuram disulfide, dipentamethylenethiuram tetrasulfide, N-cyclohexyl-2-benzothiazolylsulfenamide, N-oxydiethylene-2-benzothiazolylsulfenamide, N-tert-butyl-2-benzothiazolylsulfenamide and N,N'-dicyclohexyl-2-benzothiazolylsulfenamide.

8. The rubber composition according to claim 1, wherein the crosslinker is one or more organic peroxides selected from the group consisting of benzoyl peroxide, dicumyl peroxide, di-t-butyl peroxide, t-butyl cumyl peroxide, methylethylketone peroxide, cumene hydroperoxide, 2,5-dimethyl-2,5-di(t-butylperoxy)hexane, 2,5-dimethyl-2,5-di(benzoylperoxy)hexane, 1,3-bis(t-butylperoxypropyl)benzene, di-t-butylperoxy-diisopropylbenzene, t-butylperoxybenzene, 2,4-dichlorobenzoyl peroxide, 1,1-dibutylperoxy-3,3,5-trimethylsiloxane and n-butyl-4,4-di-t-butylperoxyvalerate.

9. The rubber composition according to claim 1, wherein the processing aid is one or more metal oxide selected from the group consisting of zinc oxides, magnesium oxides and lead oxides, one or more fatty acids selected from the group consisting of stearic acids, oleic acids and palmitic acids, or one or more selected from the group consisting of triallyl isocyanurate, ethylene glycol dimethacrylate and trimethylolpropane methacrylate.

10. The rubber composition according to claim 1, wherein the plasticizer is a derivative of phthalic acid, isophthalic acid, adipic acid, sebacic acid, benzoic acid and phosphoric acid, and one or more selected from the group consisting of dioctyl phthalate (DOP), dibutyl phthalate (DBP), di-(2-ethylhexyl)phthalate, di-iso-octylphthalate (DIOP), higher alcohol phthalate, di-(2-ethylhexyl) sebacate, polyester adipate, dibutyl diglycol adipate, di(butoxyethoxyethyl) adipate, isooctyl-tol oil fat ester, tributyl phosphate (TBP), tributoxyethyl phosphate (TBEP), tricresyl phosphate (TCP), cresyl diphenyl phosphate (CDP) and diphenyl alkane.

11. The rubber composition according to claim 1, further comprising an amount of about 0.1 to 15 parts by weight of an antioxidant and 0.1 to 10 parts by weight of a lubricant based on 100 parts by weight of the rubber.

12. The rubber composition according to claim 11, wherein the antioxidant is one or more selected from the group consisting of phenyl-α-naphthylamine, 2,2,4-trimethyl-1,2-dihydroquinoline polymer (TMDQ), 6-ethoxy-2,2,4-trimethyl-1,2-dihydroquinoline (ETMDQ), p,p'-dioctyldiphenylamine (ODPA), p,p'-dicumyldiphenylamine (DCDP), N,N'-di-2-naphthyl-p-phenylenediamine (DNPD), N,N'-diphenyl-p-phenylenediamine (DPPD), N-phenyl-N'-isopropyl-p-phenylenediamine (IPPD) and N-phenyl-N'-1,3-dimethylbutyl-p-phenylenediamine (6PPD).

13. The rubber composition according to claim 11, wherein the lubricant is one or more petroleum-based oils selected from the group consisting of paraffin-based oils, naphthene-based oils, aromatic oils, or one or more plant oils selected from the group consisting of castor oil, cotton seed oil, linseed oil, canola oil, soybean oil, palm oil, coconut oil, peanut oil, pine oil, pine-tar, tall oil, corn oil, rice bran oil, safflower oil, sesame oil, olive oil, sunflower oil, palm kernel oil, *camellia* oil, jojoba oil, macadamia nut oil, safflower oil and tung oil.

14. A flexible coupling for a vehicle MDPS steering system, comprising the rubber composition for flexible coupling of claim 1.

15. A method of manufacturing a flexible coupling for a vehicle MDPS steering system, comprising:
molding the flexible coupling comprising the rubber composition of claim 1.

* * * * *